(12) United States Patent
Sant et al.

(10) Patent No.: US 10,344,741 B2
(45) Date of Patent: Jul. 9, 2019

(54) HYDRO-PNEUMATIC ENERGY STORAGE SYSTEM

(71) Applicant: University of Malta, Msida (MT)

(72) Inventors: Tonio Sant, Mosta (MT); Daniel Buhagiar, Qormi (MT)

(73) Assignee: UNIVERSITY OF MALTA, Msida (MT)

(*) Notice: Subject to any disclaimer, the term of this patent is extended or adjusted under 35 U.S.C. 154(b) by 141 days.

(21) Appl. No.: 15/549,327

(22) PCT Filed: Jan. 31, 2016

(86) PCT No.: PCT/IL2016/050100
§ 371 (c)(1),
(2) Date: Aug. 7, 2017

(87) PCT Pub. No.: WO2016/128962
PCT Pub. Date: Aug. 18, 2016

(65) Prior Publication Data
US 2018/0030958 A1    Feb. 1, 2018

(30) Foreign Application Priority Data
Feb. 12, 2015   (IL) .......................................... 237204

(51) Int. Cl.
*F03D 9/17*   (2016.01)
*F03B 13/06*   (2006.01)
(Continued)

(52) U.S. Cl.
CPC .............. *F03D 9/17* (2016.05); *F03B 13/06* (2013.01); *F03B 13/10* (2013.01); *F03B 13/264* (2013.01);
(Continued)

(58) Field of Classification Search
CPC . F03D 9/17; F03D 13/20; F03D 13/25; F05B 2240/95; F05B 2240/93; Y02E 60/15; B63B 2035/4466; H02S 10/12
See application file for complete search history.

(56) References Cited

U.S. PATENT DOCUMENTS 4,010,614 A   3/1977   Arthur et al.
4,058,070 A   11/1977  Jones et al.
(Continued)

FOREIGN PATENT DOCUMENTS

CA        2467287 A1     11/2005
DE    102011106040 A1    12/2012
(Continued)

OTHER PUBLICATIONS

International Search Report for International Patent Application No. PCT/IL2016/050100, dated May 27, 2016 (6 pages).
(Continued)

*Primary Examiner* — Thomas E Lazo
(74) *Attorney, Agent, or Firm* — Dorsey & Whitney LLP

(57) ABSTRACT

A hydro-pneumatic energy storage system for deep sea water (DSW) is described. The system includes a floating support structure including a floating support platform, and a floating air chamber mounted on the floating support platform. The floating air chamber is configured for holding compressed air. The system also includes a sea-bottom mounted structure including a sea-bottom accumulator chamber configured for holding the compressed air and the DSW to store the DSW under pressure of the compressed air, and an air umbilical pneumatically interconnecting the floating air chamber with the sea-bottom accumulator chamber.

23 Claims, 10 Drawing Sheets

(51) Int. Cl.
  F03D 9/28 (2016.01)
  F03D 13/25 (2016.01)
  F03D 9/25 (2016.01)
  F03B 13/10 (2006.01)
  F03B 13/26 (2006.01)
  F15B 1/033 (2006.01)
  F03D 9/00 (2016.01)

(52) U.S. Cl.
  CPC ............... F03D 9/255 (2017.02); F03D 9/28 (2016.05); F03D 13/25 (2016.05); F15B 1/033 (2013.01); F03D 9/008 (2013.01); F05B 2240/40 (2013.01); F05B 2240/93 (2013.01); F05B 2240/95 (2013.01); Y02E 10/22 (2013.01); Y02E 10/38 (2013.01); Y02E 10/725 (2013.01); Y02E 10/727 (2013.01); Y02E 60/15 (2013.01); Y02E 60/17 (2013.01)

(56) References Cited

U.S. PATENT DOCUMENTS

| | | | |
|---|---|---|---|
| 4,206,608 A | 6/1980 | Bell et al. | |
| 7,239,035 B2 | 7/2007 | Bose et al. | |
| 7,743,609 B1* | 6/2010 | Brostmeyer | F02C 6/16 60/398 |
| 8,169,099 B2 | 5/2012 | Roznitsky et al. | |
| 8,662,793 B2 | 3/2014 | Wong et al. | |
| 9,939,112 B2* | 4/2018 | Lewis | F17D 1/00 |
| 2009/0129953 A1* | 5/2009 | Andersen | F03D 9/008 417/334 |
| 2012/0119510 A1* | 5/2012 | Herzen | F03D 9/28 290/1 C |
| 2013/0019591 A1* | 1/2013 | Williams | H02J 15/006 60/398 |
| 2015/0130191 A1* | 5/2015 | Houvener | F03B 11/00 290/1 A |

FOREIGN PATENT DOCUMENTS

| | | |
|---|---|---|
| DE | 102012100981 A1 | 8/2013 |
| DE | 102012011492 A1 | 12/2013 |
| EP | 1637733 A1 | 3/2006 |

OTHER PUBLICATIONS

Written Opinion of the International Searching Authority for International Patent Application No. PCT/IL2016/050100, dated May 27, 2016 (11 pages).

* cited by examiner

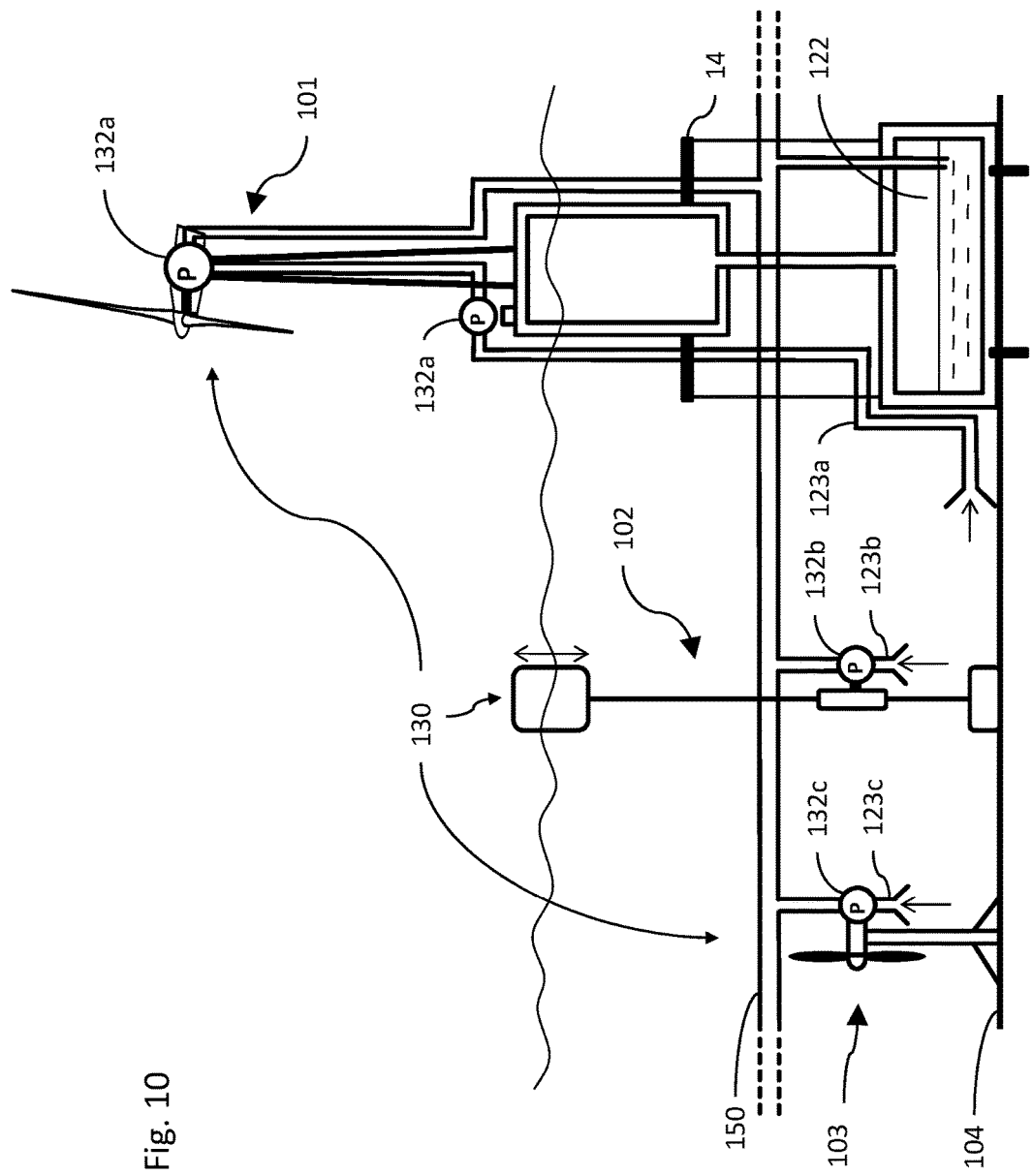

HYDRO-PNEUMATIC ENERGY STORAGE SYSTEM

FIELD OF THE INVENTION

This invention relates to technologies generating energy, and more particularly to deep offshore floating turbine technologies with energy storage facilities.

BACKGROUND OF THE INVENTION

The world's demand for electric energy is continuously increasing. A vast amount of electric energy is currently generated by oil, gas, coal or nuclear plants. However, burning oil, gas and coal results in polluted air, and all of these fuel resources are rapidly diminishing. Nuclear energy requires the disposal of nuclear waste, which remains dangerous for centuries.

Natural energy sources are effectively inexhaustible and are abundantly available throughout the world in various forms such as natural wind, solar, tidal and wave energy. Unfortunately, natural energy sources have an irregular nature, and peak demands for electrical energy in homes and in industry are usually out of phase with the availability of natural sources of energy.

Wind energy conversion technology is today regarded as one of the most technically advanced technologies available that can effectively help develop a low carbon economy while ensuring a clean and secure supply of energy. However, wind is inherently variable. Some days are windy, some are not, and even during a single day wind varies throughout the day. Consequently, a mismatch frequently occurs between potential energy available from low winds during periods of peak demand, and high winds during periods when the demands of the electrical grid may be low, such as in the evening. Further, due to the nature of wind farms being located distant to cities requiring energy, at times the power generated in wind farms can exceed the capacity of the transmission lines communicating the power to the grid requiring it. Unable to transmit the power generated during peak winds, frequently wind farms will idle turbines which could be producing electrical energy at a maximum rate.

Similarly, solar energy is most abundant typically during the middle of the day, however, solar cells generate no electricity at night. Additionally, solar energy farms are frequently located at a significant distance from the power grids they serve, and transmission lines can limit the amount of power that may be transmitted from the solar power farm to the distant grid. If transmission lines lack the capacity to transmit the full amount of power of a solar power farm produced at midday, the energy will have to be shed and wasted.

Likewise, tidal and wave power does not often coincide with the times of peak electrical energy demand.

Accordingly, it is necessary that the energy obtained from natural energy sources be somehow stored so as to be releasable during periods of power demand, as required.

A variety of techniques are available to store excess power for later delivery. One approach to energy storage is the use of batteries. Large storage batteries have been developed on a commercial basis and have been used both on farms and in industry. Electrical storage batteries, however, are objectionable due to problems relating to durability and maintenance. Moreover, many large-scale batteries use a lead electrode and acid electrolyte, and these components are environmentally hazardous.

Energy can also be stored in ultracapacitors. A capacitor is charged by line current so that it stores charge, which can be discharged rapidly when needed. Appropriate power-conditioning circuits are used to convert the power into the appropriate phase and frequency of AC. However, a large array of such capacitors is needed to store a substantial amount of electrical energy. Ultracapacitors, while being more environmentally friendly and lasting longer than batteries, are substantially more expensive, and still require periodic replacement due to the breakdown of internal dielectrics, etc.

Pumped hydro and compressed air systems are known in the art. For example, U.S. Pat. No. 4,010,614 describes a system for converting natural energy into usable electricity. The system includes an elevated reservoir for the storage of excess energy. A solar collector produces steam to drive an electrical generator and a hydraulic pump. When the demand for electrical energy is below the capacity of the generator, the excess energy is used to drive the hydraulic pump. Water is transported by the hydraulic pump from a low level reservoir to the elevated reservoir to thereby store potential energy. When demand increases beyond the capacity of the generator or when the supply of solar energy is decreased sufficiently, water from the elevated reservoir is used to drive a second electrical generator.

U.S. Pat. No. 4,058,070 describes a system utilizing kinetic energy of the wind that is converted into compressed air which is stored, in the system, at a predetermined output pressure. The compressed air is used for driving a turbine coupled to an electrical power generator.

U.S. Pat. No. 4,206,608 describes an apparatus and method for utilizing natural energy in the production of electricity. The natural energy obtained from a plurality of natural energy sources is utilized to pressurize hydraulic fluid. A plurality of natural energy sources are used so that periodic and intermittent fluctuations in the supply of natural energy of one particular form may be compensated for by the other forms of natural energy. The pressurized hydraulic fluid is supplied to a pressure storage tank wherein a compressible fluid is compressed by the pressurized hydraulic fluid. Electrical energy is produced by the pressurized hydraulic fluid and is supplied as needed to various consumers. Excess electricity which is not needed by consumers is supplied to an electric motor which drives a hydraulic pump. The excess energy is thereby utilized to pressurize hydraulic fluid which is supplied to the high pressure storage tanks. In this way, excess energy is conserved and is not wasted needlessly.

U.S. Pat. No. 7,239,035 describes an integrated, wind-pumped hydro power generation system that includes at least one wind turbine generator device configured to generate output power for a common bus, and at least one hydro generator device configured to generate output power for the common bus. The hydro generator device is powered by water flow. The wind turbine generator device and the hydro generator device include corresponding local controls associated therewith, and a set of supervisory controls is in communication with the common bus and each of the local controls.

Existing commercial offshore wind farms are based on seabed-mounted foundations technology to support wind turbines that are only suited for shallow waters typically at depths usually not exceeding 50 meters. Floating offshore wind technologies enable the exploitation of untapped wind resources at deep water sites further away from the coast where marine wind energy resources are more abundant and continuous than those on shore. Moreover, issues related to visual, noise and ecological impacts, as well as potential conflicts with shipping, aviation and coastal surveillance are expected to be of a lesser concern.

For example, U.S. Pat. No. 8,169,099 describes a deep off-shore floating wind turbine apparatus and methods of manufacturing, operating, maintaining, protecting and conveying the wind turbine apparatus. The wind turbine includes a rotor converting a motion of air into a movement of the rotor, a hub housing equipment that transforms the movement of the rotor into a useful form of energy, and a tower supporting the hub on one end. The wind turbine further includes a base floating substantially at the water surface and movable with respect to the underlying solid surface. The tower is connected to the floating base on the second end. The wind turbine also includes a tilting mechanism tilting the wind turbine into a substantially horizontal orientation and bringing it back into an upright position, as well as a rotating mechanism operable to control azimuth orientation of the wind turbine.

U.S. Pat. No. 8,662,793 describes a floating wind farm that includes a plurality of floating rafts connected with one another and disposed in a body of water below the water by a predetermined distance. A plurality of wind turbines are connected to the floating rafts respectively and configured to be driven by wind and thereby generate power. A power generator is connected to the floating rafts. A plurality of anchors are connected to the floating rafts respectively and disposed in the water for confining the location of the floating rafts. Each of the floating rafts includes at least three pipes and a plurality of ballast blocks attached to the pipes. The pipes are configured to store air compressed by the power generated by the wind turbines. The power generator is configured to generate and output electricity from the compressed air stored in the pipes.

GENERAL DESCRIPTION OF THE INVENTION

The concept of the invention involves storage of pressurised cold deep sea water, enabling the concurrent exploitation of wind, solar, tidal and wave energy and thermal energy available in deep sea while mitigating problems originating from intermittency in natural energy sources.

Offshore wind, wave and tidal turbine technologies are usually based on systems in which a rotor of a wind, wave or tidal turbine drives an electrical generator that converts the rotational mechanical energy into electricity, which is then transported to shore via an electrical infrastructure consisting of cables and a transformer station. However, renewable energy from existing offshore turbine technologies in which the wind, wave or tidal turbine is associated with an electrical power generator is expensive at offshore sites located in relatively deep areas, and especially where wind speeds or wave and tidal currents are low. Moreover, when the electric energy is directly generated by the wind, wave and tidal turbines, this energy cannot be effectively stored so as to be dispatched during periods of power demand, as required. Integration of deep offshore floating turbine technologies with energy storage facilities can mitigate problems associated with the intermittent supply of natural energy by providing a regulated supply of pressurized deep sea water. Potential energy of pressurized deep sea water can, for example, be converted into electricity by allowing the pressurized deep sea water to flow through a hydraulic turbine connected to an electric generator.

Furthermore, deep water sites provide an immense resource of renewable thermal energy that can be used for cooling or heating applications. This resource is driven by thermocline phenomena whereby the seawater experiences thermal stratification with the water temperature decreasing with depth for most of the year. This is a consequence of the fact that the upper sea layers are more exposed to absorb solar radiation than the lower ones. At greater depth limits, the temperature gradients are no longer evident and the temperature reaches a stable level, independent of season. This variation of temperature with sea depth may be divided into three distinct zones: the mixed upper layer, the thermocline, where rapid variations in temperature occur, and the deep sea layer where a stable temperature is reached. The temperature of deep sea water may be considerably higher or lower than the ambient air temperatures in urban areas for most of the year, thereby providing potential for cooling or heating of buildings. One should take note of the fact that there exist significant populations living in coastal locations adjacent to deep bodies of water. An appreciable portion of these locations have substantial cooling demands. Moreover, large-scale plants demanding large amounts of energy for cooling (e.g., natural gas liquefication plants) are also located at the coast. There is thus a need in the art for, and it would be useful to explore the possibility of utilizing offshore natural power farms located at deep water sites in order to extract deep sea water and store it at high pressure.

It would be useful to have a hydro-pneumatic energy storage system located at deep water sites that can store pressurized sea water and enable transportation of the pressurized sea water to shore for the purposes of generating electricity and cooling. For example, rather than producing electricity directly, the individual wind, tidal, wave turbines would pump sea water under high pressure to a centralized hydro-electric station for generating electricity and for cooling in buildings and industrial processes. This can result in reducing the cost of renewable energy from offshore wind, tidal and wave and solar farms.

The present disclosure satisfies the aforementioned need by providing a novel hydro-pneumatic energy storage system for deep sea water (DSW).

The system includes a floating support structure including a floating support platform and a floating air chamber. The floating air chamber is mounted on the floating support platform and is configured for holding compressed air. The system also includes a sea-bottom mounted structure including a sea-bottom accumulator chamber. The sea-bottom accumulator chamber is configured for holding compressed air and the DSW to store the DSW under pressure of the compressed air.

The floating air chamber and the sea-bottom accumulator chamber are pneumatically interconnected with an air umbilical. The air umbilical includes an air conduit configured to provide a pneumatic communication for linking the compressed air of the floating air chamber with the compressed air of the sea-bottom accumulator chamber.

According to an embodiment of the present invention, the sea-bottom mounted structure includes a sea water inlet pipeline passing from a DSW region to the sea-bottom accumulator chamber and is hydraulically coupled to an inlet port of the sea-bottom accumulator chamber, and an outlet pipeline coupled to the sea-bottom accumulator chamber configured to discharge the DSW egress flow.

According to an embodiment of the present invention, the floating air chamber has a volume sufficient for the compressed air in the air chamber to provide necessary buoyant force to the floating support platform.

According to an embodiment of the present invention, the hydro-pneumatic energy storage system includes a set of mooring lines configured for anchoring the floating support structure. According to one example, the floating support structure is anchored to the sea-bottom mounted structure. According to another example, the floating support structure is anchored to a sea-bed.

According to one embodiment of the present invention, the sea-bottom mounted structure is rigidly fixed to a sea-bed by driven piles inserted in the sea-bed.

According to another embodiment of the present invention, the sea-bottom mounted structure is rigidly fixed to the sea-bed through a gravity-based system.

According to an embodiment of the present invention, the floating support structure includes a pneumatic control valve pneumatically connected to the floating air chamber, and configured to pressurize the hydro-pneumatic energy storage system with compressed air.

According to an embodiment of the present invention, the sea-bottom mounted structure includes an outlet hydraulic control valve arranged in the outlet pipeline and configured to regulate the DSW egress flow from the sea-bottom accumulator chamber.

According to an embodiment of the present invention, the hydro-pneumatic energy storage system includes a control system coupled to the pneumatic control valve and to the hydraulic control valve for controlling operation thereof.

According to an embodiment of the present invention, the control system includes at least one pneumatic pressure sensor, at least one hydraulic pressure sensor, two water level sensors, at least one flow meter, and an electronic controller operatively coupled to said at least one pneumatic pressure sensor, said at least one hydraulic pressure sensor and said at least one flow meter.

The pneumatic pressure sensors are configured for producing air pressure sensor signals representative of the air pressure in the floating air chamber and/or the sea-bottom accumulator chamber. The hydraulic pressure sensors are configured for producing hydraulic pressure sensor signals representative of the DSW pressure within the sea water inlet pipeline and/or within the outlet pipeline. The water level sensors can be arranged inside the sea bottom mounted structure and configured for producing minimal and maximal DSW level signals to ensure that the level of DSW inside the sea-bottom accumulator chamber is within a predetermined level limit range.

The flow meters can for example be arranged within the sea water inlet pipeline and within the outlet pipeline, and can be configured for producing DSW flow sensor signals representative of the DSW flow within the sea water inlet pipeline and within the outlet pipeline. The electronic controller is responsive to the air pressure sensor signals, the hydraulic pressure sensor signals and the DSW flow sensor signals. The electronic controller is, inter alia, capable of generating control signals for controlling the operation of the pneumatic control valve and the hydraulic control valve.

According to an embodiment of the present invention, the hydro-pneumatic energy storage system includes a compression system arranged within the sea water inlet pipeline. The compression system includes a pump configured for pumping the DSW through the sea water inlet pipeline to the sea-bottom accumulator chamber for storing the DSW at a predetermined pressure.

According to an embodiment of the present invention, the hydro-pneumatic energy storage system further includes a prime mover engaged with the compression system and configured to drive the pump.

According to one embodiment of the present invention, the pump of the compression system is an electric pump that is coupled to an electrical power grid and powered by electricity. According to this embodiment, the prime mover can include at least one renewable energy system configured to generate output electrical power and provide it to the grid. The renewable energy system can be selected from an electrical wind turbine system, an electrical tidal turbine system, an electrical sea wave turbine system and an electrical solar system.

According to one example, the prime mover includes an electrical wind turbine system. The electrical wind turbine system includes a rotor driven by wind, a plurality of wind vanes disposed on the rotor and configured to intercept prevailing winds, and an electrical generator operatively engaged with the rotor and connected to the electrical power grid. The electrical generator is configured to generate output electrical power and provide it to the grid.

According to another example, the prime mover includes an electrical tidal turbine system. The electrical tidal turbine system includes a rotor driven by tidal current, a plurality of wind vanes disposed on the rotor and configured to intercept prevailing tidal current, and an electrical generator operatively engaged with the rotor and connected to the electrical power grid. The electrical generator is configured to generate output electrical power and provide it to the grid.

It should be noted that when the prime mover includes an electrical turbine system (either a wind turbine system or a tidal turbine system), the pump consumes electricity from the grid in order to pump deep sea water under pressure into the energy storage system.

According to another embodiment of the present invention, the pump of the compression system is a hydraulic pump. The prime mover includes at least one renewable energy system mechanically coupled to said hydraulic pump for driving thereof, said at least one renewable energy system selected from a hydraulic wind turbine system, a hydraulic sea wave turbine system and a hydraulic tidal turbine system.

According to one example, the prime mover includes a hydraulic wind turbine system. The hydraulic wind turbine system includes a rotor driven by wind and mechanically coupled to the hydraulic pump, and a plurality of wind vanes disposed on the rotor and configured to intercept prevailing winds.

According to another example, the prime mover includes a hydraulic tidal turbine system. The hydraulic tidal turbine system includes a rotor driven by tidal current and mechanically coupled to said hydraulic pump for driving thereof, and a plurality of vanes disposed on the rotor and configured to intercept prevailing tidal current.

According to one general aspect of the present invention, there is provided a hydro-pneumatic energy storage assembly comprising a plurality of the hydro-pneumatic energy storage systems described above arranged in series and interconnected through sea water pipelines.

According to one general aspect of the present invention, there is provided a hydro-pneumatic energy storage assembly comprising a plurality of floating support structures interconnected with a plurality of sea-bottom mounted structures through deep sea water pipelines and through pneumatic pipelines. The sea-bottom mounted structures are arranged in series and are interconnected through sea water pipelines, wherein the floating air chamber of each floating support structure is interconnected with the sea-bottom accumulator chambers of two neighboring sea-bottom mounted structures through pneumatic pipelines.

The energy storage system of the present invention has many of the advantages of the prior art techniques, while simultaneously overcoming some of the disadvantages normally associated therewith.

The proposed integration of an energy storage system in floating support structures in deep waters allows for storage of cold pressurized deep sea water, making it possible to concurrently store energy received from natural energy sources in two forms, such as: (i) potential energy, which may be converted to electricity by allowing the pressurized deep sea water to flow through a hydraulic turbine connected to an electric generator; and (ii) thermal renewable energy suitable for cooling purposes.

The concept of having wind turbines pump pressurized sea water directly, in lieu of generating electricity, is expected to offer some other important advantages in offshore wind exploitation: it would facilitate the integration of wind, solar, tidal and/or wave power with wave power extracting devices, energy storage systems and reverse osmosis desalination plants. It would also reduce the need for copper and rare earth materials. Apart from potentially reducing costs by minimizing the use of copper and rare earth materials required for electrical systems, this approach can facilitate the integration of wind, solar, tidal and/or wave farms with hydro-energy storage systems, thus mitigating problems associated with grid congestion and stability.

An additional advantage of the energy storage system herein disclosed is that it enables mitigating problems associated with the unreliable intermittent supply of natural energy by providing a regulated supply of pressurized and cold deep sea water.

A further advantage of the energy storage system herein disclosed is that it may be continually upgraded to be sized as needed, which is effective for both long term and short term energy storage.

The hydro-pneumatic energy storage system of the present invention only requires minimal moving parts. Unlike other energy storage technologies such as batteries, the system has a long service lifetime and its performance does not degrade with the number of energy storage cycles. Furthermore, the utilized materials are mainly limited to steel/concrete.

By utilizing hydraulic wind, wave and tidal turbines providing a directly pressurized supply of DSW, energy is stored in the form generated, hence reducing losses associated with energy storage.

The storage of pressurized DSW at the sea-bed rather than in the upper floating support structure, ensures that floating stability is not influenced by energy storage operations and that the stored DSW will not get warmer but rather retain the fixed sea bottom temperature.

The compressed air chamber on the floating support platform can be easily accessible for pressurization/depressurization during installation and maintenance through a valve located at the upper floating support structure.

The hydro-pneumatic energy storage system of the present invention allows for a more pressure stable hydraulic network due to maximizing the use of volume for compressed air by using the volume of the upper floating structure. This provision may further facilitate the integration of offshore wind farms with other intermittent marine renewable energy technologies (such as wave and sea current energy) as well as desalination plants relying on reverse osmosis technologies.

The integration of the proposed hydraulic-based storage system allows for the installation of smaller (hence cheaper) diameter pipelines in wind, wave and tidal farms based on hydraulic power transmission.

The commercialization of floating offshore wind technologies in the near future will open endless opportunities to develop large offshore wind farms capable of meeting a considerable share of energy demand. Yet, technical problems originating from intermittency in the wind and other natural energy sources are regarded as major obstacles for the integration of large offshore natural sources into national grids. The integration of energy storage systems is therefore considered as a crucial development to facilitate the exploitation of power of natural energy sources on a wide scale. Minimizing the energy storage costs by optimizing energy storage efficiencies and minimizing the additional infrastructural costs required is critical to maintain wind energy production within feasible limits.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 10 is a schematic cross-sectional view of the hydro-pneumatic energy storage system configured to utilize renewable energy of natural sources, according to another embodiment of the present invention.

DETAILED DESCRIPTION OF EMBODIMENTS

Figure 1:
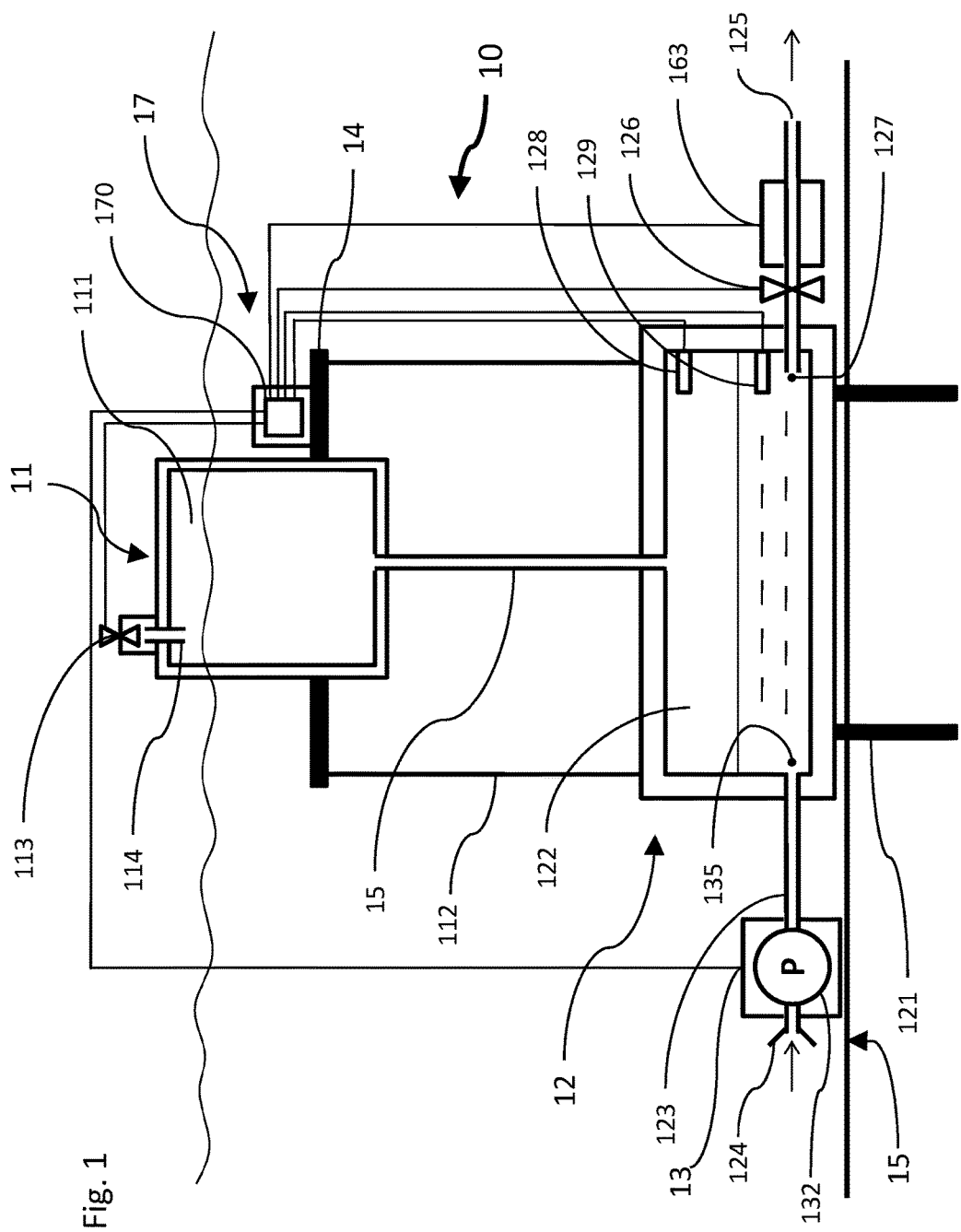
FIG. 1 is a schematic cross-sectional view of a hydro-pneumatic energy storage system, according to one embodiment of the present invention.

The principles and operation of the hydro-pneumatic energy storage system according to the present invention may be better understood with reference to the drawings and the accompanying description. It should be understood that these drawings are given for illustrative purposes only and are not meant to be limiting. It should be noted that the figures illustrating various examples of the system of the present invention are not to scale, and are not in proportion, for purposes of clarity. It should be noted that the blocks as well other elements in these figures are intended as functional entities only, such that the functional relationships between the entities are shown, rather than any physical connections and/or physical relationships. The same reference numerals and alphabetic characters are utilized for identifying those components which are common in the hydro-pneumatic energy storage system and its components shown in the drawings throughout the present description of the invention. Examples of constructions are provided for selected elements. Those versed in the art should appreciate that many of the examples provided have suitable alternatives which may be utilized.

Referring to FIG. 1, a schematic cross-sectional view of a hydro-pneumatic energy storage system 10 is illustrated, according to one embodiment of the present invention. The hydro-pneumatic energy storage system 10 includes a floating support structure 11 and a sea-bottom mounted structure 12.

According to some embodiments, the floating support structure 11 includes a floating support platform 14 and a floating air chamber 111 having a volume for holding compressed air, and mounted on the floating support platform 14. The volume of the air chamber 111 has a sufficient value to provide necessary buoyant force to the floating support platform 14.

It should be understood that the floating structure of the floating support platform structure 11 may also provide support for ancillary systems and services pertaining to, but not limited to, offshore wind farm operation/maintenance systems (not shown), oil and gas infrastructures (not shown), a floating artificial island (not shown) that can utilize the hydro-pneumatic energy storage system 10 for generation of electricity for a grid, providing cooling for buildings and technical systems as well as for other services.

According to some embodiments, the sea-bottom mounted structure 12 includes a sea-bottom accumulator chamber 122, enabling deep sea water to be stored under pressure of the compressed air located in the sea-bottom accumulator chamber 122. The sea-bottom mounted structure 12 also includes a sea water inlet pipeline 123 passing from a DSW region to the sea-bottom accumulator chamber 122. The sea water inlet pipeline 123 is hydraulically coupled to an inlet port 135 of the sea-bottom accumulator chamber 122. When desired, the inlet end 124 of the sea water inlet pipeline 123 may extend further offshore than the floating support structure 11 to source colder DSW from deeper waters.

The floating air chamber 111 is interconnected to the sea-bottom accumulator chamber 122 through an air umbilical 15. The air umbilical 15 includes an air conduit that provides a pneumatic communication enabling for linking the compressed air volumes of the floating air chamber 111 and the sea-bottom accumulator chamber 122. The air umbilical 15 enables effectively increasing the compressed air volume of the sea-bottom accumulator chamber 122, thereby improving the pressure transient response characteristics of the energy storage system under the influence of an intermittent intake of DSW supplied by a prime mover into the sea-bottom accumulator chamber 122.

The floating support structure 11 can be maintained in a stable position via a set of mooring lines 112 configured for anchoring the floating support structure 11. According to the embodiment shown in FIG. 1, the floating support structure 11 is anchored to the sea-bottom mounted structure 12. According to another embodiment, the floating support structure 11 can be anchored directly to the sea-bed 15.

According to the embodiment shown in FIG. 1, the sea-bottom mounted structure 12 is rigidly fixed to the sea-bed 15 through structural elements including a set of driven piles 121 that can be inserted in the sea-bed 15. According to another embodiment, the sea-bottom mounted structure 12 can be rigidly fixed to the sea-bed 15 through a gravity-based system (not shown) including ballasts resting on the sea-bed or anchors depending on the type sea-bed and the depth of the installation site.

As shown in FIG. 1, the floating support structure 11 of hydro-pneumatic energy storage system 10 includes one floating air chamber 111 mounted on the floating support platform 14. It should be understood that when desired a plurality of the floating compressed air chambers 111 can be used to achieve the increase in compressed air volume, which can be simultaneously used for buoyancy and stability. This additional volume can absorb the pressure transients resulting from changes in the state-of-charge of the sea-bottom accumulator chamber 122.

The air-hydraulic pressure within the floating air chamber 111 communicating with the sea-bottom accumulator chamber 122 should be sufficient to provide sea water to various hydraulic electricity generators and cooling systems. For example, the air-hydraulic pressure within floating air chamber 111 can be in the range of about 150 bar to 160 bar.

It should be understood that generally, floating air chamber 111 and the sea-bottom accumulator chamber 122 can have any desired shape and be constructed of a suitable metal, plastic or composite material with thickness of the walls appropriate to withstand the strain on the walls caused by the air-hydraulic pressure inside the floating air chamber 111 and the sea-bottom accumulator chamber 122.

According to an embodiment, the floating support structure 11 includes a pneumatic control valve 113 installed in a manifold 114 pneumatically connected to the floating air chamber 111 and configured to enable the hydro-pneumatic energy storage system to be pressurized with compressed air. The floating air chamber 111 of the hydro-pneumatic storage system 10 can be pre-charged with air using one or more air compressors (not shown) that can be either a part of the system or located on a removable infrastructure, such as a barge (not shown). The pneumatic control valve 113 can, for example, be located in an unwetted area of the floating support platform 14 where it is easily accessible. When required, the system 10 can also include one or several safety valves (not shown) that can automatically open when pressure in the floating air chamber 111 reaches a dangerous level.

According to an embodiment, the sea-bottom mounted structure 12 includes an outlet pipeline 125 coupled to an outlet 127 of the sea-bottom accumulator chamber 122. The outlet pipeline 125 is equipped with an outlet hydraulic control valve 126 arranged in the outlet pipeline 125. The hydraulic control valve 126 is configured to regulate the DSW flow from the system such that a desired flow rate of egress of the DSW is maintained over specified periods of time through the outlet pipeline 125.

In operation, the deep sea water transferred through the outlet pipeline 125 can be supplied to a hydraulic turbine (not shown) coupled to an electrical generator for generating electricity. After passing the hydraulic turbine, the deep sea water may still be used for cooling purposes as long as the exit pressure is high enough to allow the flow of the deep sea water across the pipeline up to the point where such cooling is required.

According to some embodiments, the hydro-pneumatic energy storage system 10 includes a control system generally indicated by a reference numeral 17. The control system 17 is coupled, inter alia, to the pneumatic control valve 113 and to the outlet hydraulic control valve 126.

The control system 17 is a computer system distributed throughout the floating support platform 14 and the sea-bottom mounted structure 12. Generally, the control system 17 may include, without limitations, flow meters, sensors, actuators, monitoring devices, as well as other similar or suitable devices. Each may be a commercially available component. The control system 17 also includes an electronic controller 170 programmed with a software model stored in a computer-readable medium (not shown), and configured for controlling operation of the hydro-pneumatic energy storage system 10.

In the exemplary embodiment shown in FIG. 1, the electronic controller 170 of the control system is installed at the floating support platform 14. However, when desired, the electronic controller of the control system can be installed at the sea-bed mounted structure 12. Likewise, the electronic controller of the control system can be arranged at some intermediate position in the system.

For measuring pressure of the air within the floating air chamber 111 and within the volume of the sea-bottom accumulator chamber 122 that is unoccupied by DSW, the control system includes one or more pneumatic pressure sensors (not shown) that can be operable for producing air pressure sensor signals throughout operation of the system. Likewise, the control system includes one or more hydraulic pressure sensors (not shown) that can be operable for producing hydraulic pressure sensor signals throughout operation of the system. The location of the pneumatic and hydraulic pressure sensors depends on the specific configuration of the system. For example, the pneumatic pressure sensors can be arranged in the floating air chamber 111 and/or in the sea-bottom accumulator chamber 122. In turn, the hydraulic pressure sensors can be arranged within the sea water inlet pipeline 123 to measure a pressure of the ingress flow and within the outlet pipeline 125 to measure a pressure of the egress flow. When required, the control system 17 can alert the operator of any detrimental pressure drops. The gas and hydraulic pressure sensor signals can be relayed to the electronic controller 170 via a connecting wire, or wirelessly.

According to some embodiments, the control system 17 includes an upper water level sensor 128 and a lower level sensor 129 arranged inside the sea-bottom accumulator chamber 122 of the sea bottom mounted structure 12. The upper water level sensor 128 and the lower level sensor 129 are configured for producing minimal and maximal DSW level signals, correspondingly, to ensure that the level of DSW inside the sea-bottom accumulator chamber 122 is within a predetermined level limit range.

To provide regulation of the flow rate, the control system 17 of the hydro-pneumatic energy storage system 10 can include one or more flow meters arranged within the sea water inlet pipeline 123 and within the outlet pipeline 125, and configured for producing DSW flow sensor signals representative of the DSW ingress flow within the sea water inlet pipeline and the DSW egress flow within the outlet pipeline 125, correspondingly.

The electronic controller 170 is operatively coupled to the pneumatic pressure sensors, the hydraulic pressure sensor, water level sensors and to the flow meters for controllable pumping DSW to the sea-bottom accumulator chamber 122 and for controllable discharge of the DSW from the sea-bottom accumulator chamber 122. The electronic controller 170 is, inter alia, responsive to the air pressure sensor signals, the hydraulic pressure sensor signals, the minimal and maximal DSW level signals and the DSW flow sensor signals, respectively. The electronic controller 170 is capable of generating control signals to control operation of the pneumatic control valve 113 and the outlet hydraulic control valve 126. The location of flow meters along the sea water inlet pipeline 123 and within the outlet pipeline 125 depends on the specific system configuration.

In particular, when the DSW level becomes lower than the lower level limit, the electronic controller 170 generates a control signal to close the hydraulic control valve 126. This enables avoiding compressed air from being lost and having the system de-pressurized. Likewise, when the DSW level exceeds an upper level limit, the electronic controller 170 generates control signals to open the hydraulic control valve 126, so as to decrease the level to a desired value.

The discharge flow of the DSW within the outlet pipeline 125 can be measured by an outlet flow meter 163 that is operable for producing a DSW outlet flow sensor signal. The flow meter 163 is coupled to the electronic controller 17 of the control system which is, inter alia, responsive to the DSW outlet flow sensor signal and capable of generating a valve control signal for controlling the operation of the hydraulic control valve 126. Depending on the power attributes of the hydro-pneumatic energy storage system 10 (input availability and output demand), a desired egress flow rate from the system can be specified and maintained by the electronic controller 170 during operation of the system, while the line hydraulic pressure is maintained by the gas pressure in the floating air chamber 111 and/or in the sea-bottom accumulator chamber 122. The outlet hydraulic control valve 126 ensures a stable supply of pressurized DSW to produce constant electrical power output over stipulated periods, hence overcoming certain technical problems encountered with conventional technology when feeding electricity to the grid.

According to some embodiments, hydro-pneumatic energy storage system 10 includes a compression system schematically indicated by a reference numeral 13. The compression system 13 includes a prime mover (not shown) and a pump 132 engaged with the prime mover, and configured for pumping deep sea water (DSW) into the sea-bottom accumulator chamber 122. In the sea-bottom accumulator chamber 122, the DSW is pressurized, thereby also compressing the air. The pressurized DSW is stored at high pressure in the hydro-pneumatic energy storage system 10. The compression system 13 is hydraulically coupled to an inlet port 135 of the sea-bottom accumulator chamber 122 through the sea water inlet pipeline 123. Various implementations of the compression system 13 will be described hereinbelow.

According to some embodiments, the electronic controller 170 is also operatively coupled to the pump 132 for controllable pumping DSW into the sea-bottom accumulator chamber 122. In particular, when the DSW level becomes lower than the lower level limit, in response to the minimal DSW level signal of the lower level sensor 129, the electronic controller 170 generates a control signal to close the hydraulic control valve 126 and/or turn-on the pump 132 to start pumping deep sea water into the the sea-bottom accumulator chamber 122. On the other hand, when the DSW level in the sea-bottom accumulator chamber 122 exceeds an upper level limit, in response to the maximal DSW level signal of the upper level sensor 128, the electronic controller 170 generates a control signal to open the hydraulic control valve 126 and/or turn-off the pump 132 to stop pumping deep sea water into the sea-bottom accumulator chamber 122, so as to decrease the level to a desired value.

The compressed air within the floating air chamber 111 and within the volume of the sea-bottom accumulator chamber 122 serves the role of a pneumatic accumulator in damping fluctuations in pressure arising from the intermittent supply of DSW from the prime mover and transients induced by the operation of the outlet hydraulic control valve 126. The energy storage capability of the proposed system depends on the pressure and volume of the DSW contained in the sea-bottom accumulator chamber 122. While the volume is fixed depending on the design of the adopted structure, the pressure may be varied depending on the operational requirements of the system. It should be noted that according to the proposed invention, any loss of pneumatic pressure would not cause the hydro-pneumatic energy storage system 10 to become structurally unstable.

Figure 2:
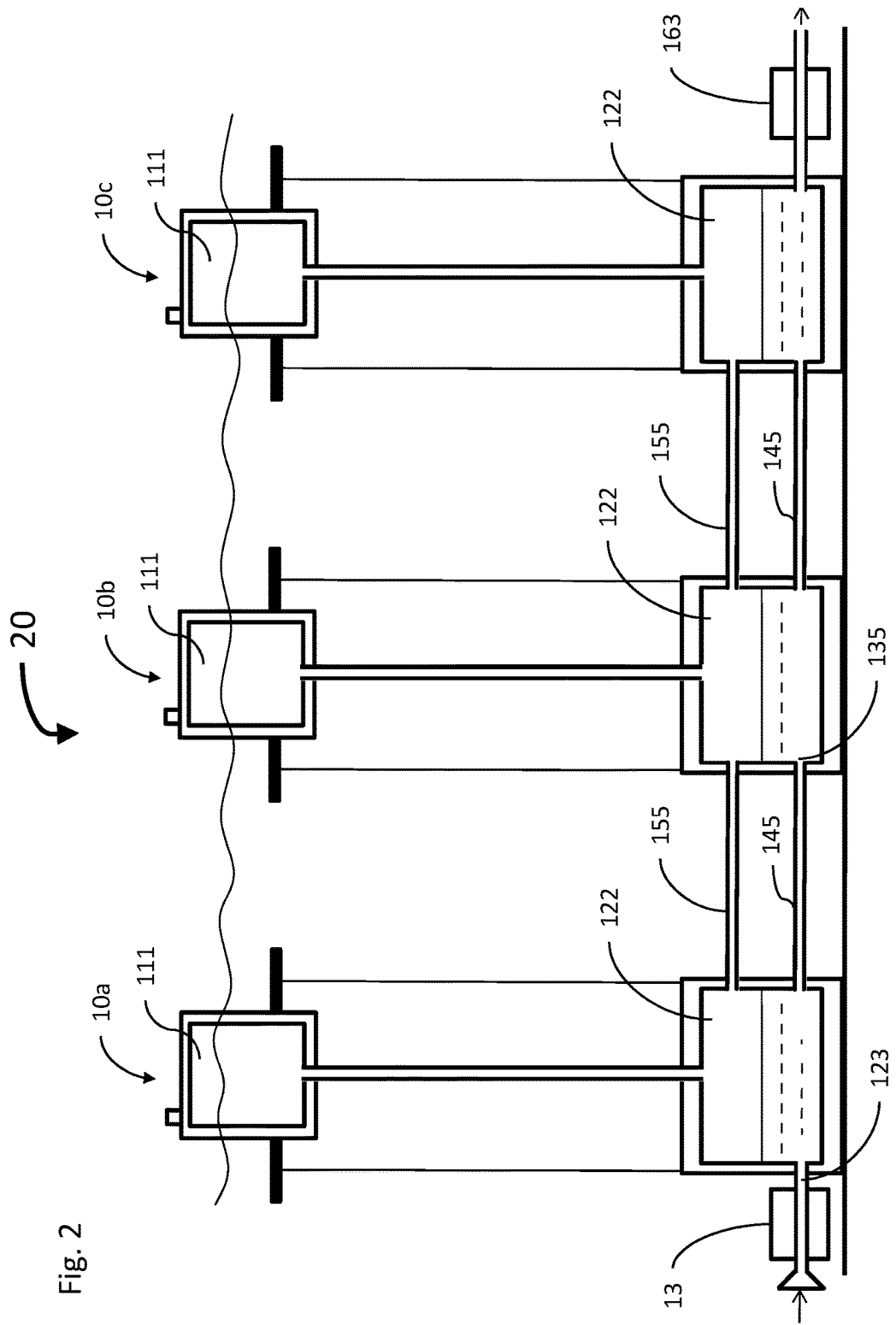
FIG. 2 is a schematic cross-sectional view of a hydro-pneumatic energy storage assembly, according to an embodiment of the present invention.

Referring to FIG. 2, a schematic cross-sectional view of a hydro-pneumatic energy storage assembly 20 is illustrated, according to an embodiment of the present invention. According to this embodiment, a hydro-pneumatic energy storage assembly includes a plurality of the hydro-pneumatic energy storage systems (10 shown in FIG. 1) which are arranged in series and are interconnected through sea water pipelines. Such a configuration provides enhanced buoyancy and stability to the storage system.

As shown in FIG. 2, DSW is provided by the compression system 13 to the sea-bottom accumulator chamber 122 of the first hydro-pneumatic energy storage system 10a through the sea water inlet pipeline 123. An outlet pipeline 145 of the sea-bottom mounted structure of first hydro-pneumatic energy storage system 10a is coupled to an inlet port 135 of the sea-bottom accumulator chamber 122 of the second hydro-pneumatic energy storage system 10b and so on. The floating air chambers 111 of the storage systems 10a, 10b, etc. are coupled by pneumatic pipelines 155.

In this case, the outlet pipeline of the storage system 10a operates as a sea water inlet pipeline of the second storage system 10b. The deep sea water exiting the last (in series) hydro-pneumatic energy storage system can be supplied to a hydraulic turbine (not shown) coupled to an electrical generator (not shown) for generating electricity. After passing the hydraulic turbine, the deep sea water may still be used for cooling purposes as long as the exit pressure is high enough to allow the flow of the deep sea water across the pipeline up to the point where such cooling is required.

Figure 3:
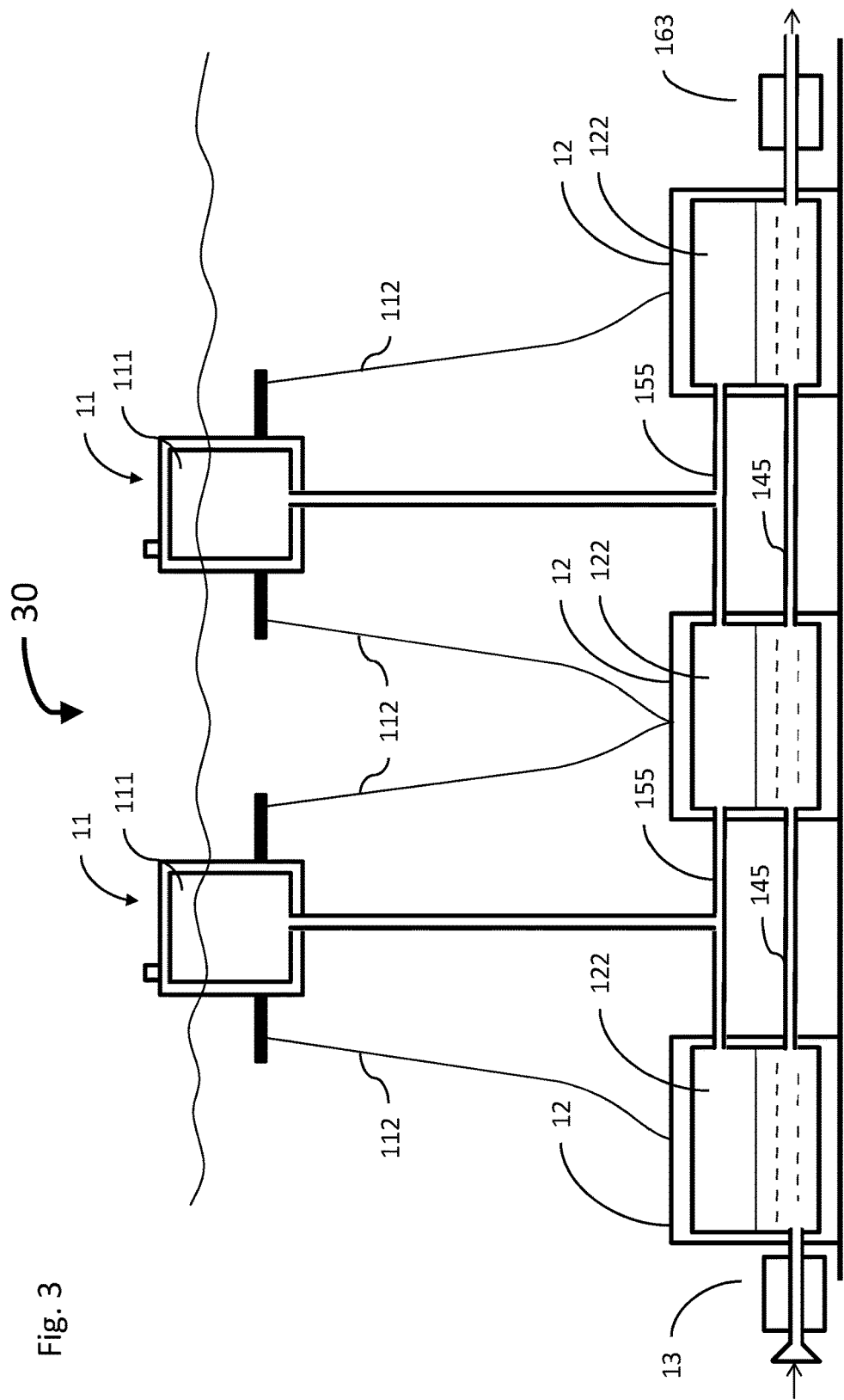
FIG. 3 is a schematic cross-sectional view of a hydro-pneumatic energy storage assembly, according to another embodiment of the present invention.

Referring to FIG. 3, a schematic cross-sectional view of a hydro-pneumatic energy storage assembly 30 is illustrated, according to another embodiment of the present invention. This embodiment is suitable in cases where anchoring points are to be located considerably away from the prime mover mounted on the floating support structures 11. This configuration may be installed in a way to serve the dual purpose of acting as anchoring locations and also as energy storage.

As shown in FIG. 3, the hydro-pneumatic energy storage assembly 30 includes a plurality of the floating support structures 11 interconnected with a plurality of the sea-bottom mounted structures 12 through deep sea water pipelines 145 and through pneumatic pipelines 155. Specifically, the sea-bottom mounted structures 12 of the assembly 30 are arranged in series and are interconnected through sea water pipelines 145 similar to assembly (20 in FIG. 2). The deep sea water exiting the last (in series) sea-bottom mounted structures 12 of the assembly 30 can be supplied to an electric hydraulic turbine for generating electricity and also used for cooling purposes.

The hydro-pneumatic energy storage assembly 30 differs from the assembly (20 in FIG. 2) in the fact that the floating air chamber 111 of each floating support structure 11 is interconnected with the sea-bottom accumulator chambers 122 of two neighboring sea-bottom mounted structures 12 through pneumatic pipelines 155, however other interconnecting configurations are also contemplated. According to the embodiment shown in FIG. 3, all the floating compressed air chambers 111 and the sea-bottom accumulator chambers 122 communicate, thereby forming a common air volume composed from air volumes of the floating compressed air chambers 111 and the air volumes of the sea-bottom accumulator chambers 122. This combined volume can facilitate smoothing of the pressure transients resulting from changes in the state-of-charge of the last sea-bottom accumulator chamber 122.

The floating support assemblies 11 can be maintained in a stable position via a set of mooring lines 112 configured for anchoring the floating support structure 11. According to the embodiment shown in FIG. 3, the floating support structures 11 are anchored to the sea-bottom mounted structures 12. According to some embodiments, catenary moorings are used as anchor lines for anchoring the floating support structures 11.

Turning now to FIGS. 4 through 8, various types of the compression system 13 suitable for providing deep sea water (DSW) to the hydro-pneumatic energy storage system 10 for storing the DSW at high pressure are described hereinbelow. It should be noted that not all components of the hydro-pneumatic energy storage system 10 are shown and/or indicated in these figures, but mainly those which are necessary for description of operation of the compression system 13.

Figure 4:
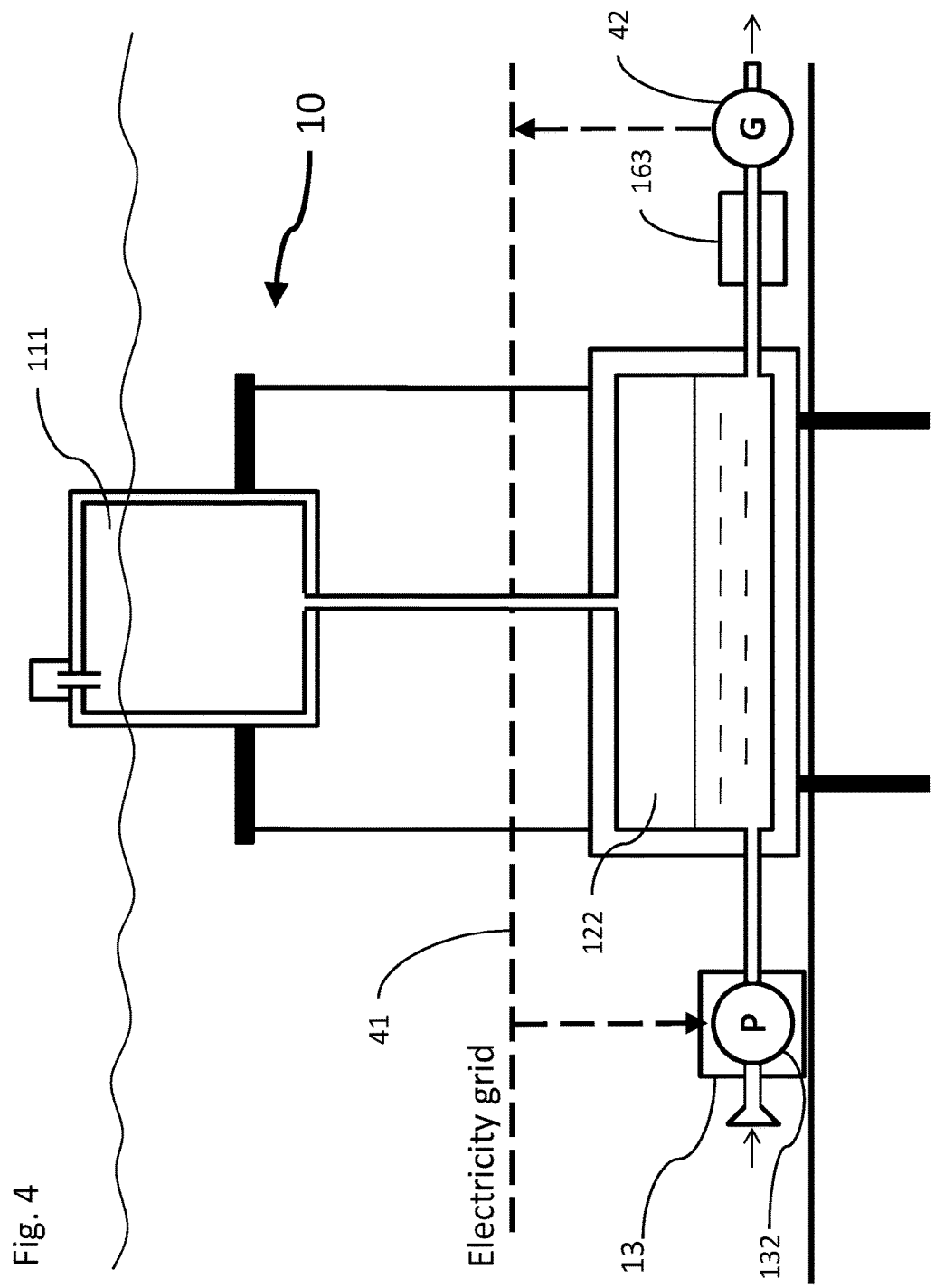
FIG. 4 is a schematic cross-sectional view of the hydro-pneumatic energy storage system connected to an electricity grid network, according to an embodiment of the present invention.

FIG. 4 is a schematic cross-sectional view of the hydro-pneumatic energy storage system 10 connected to an electricity grid network, according to an embodiment of the present invention.

This embodiment allows for the integration of the energy storage system 10 into an offshore electrical power grid. According to this embodiment, the pump 132 of the compression system 13 is an electric pump that is coupled to an offshore electrical power grid 41 and powered by electricity. In operation, the pump 132 pumps deep sea water and supplies it to the sea-bottom accumulator chambers 122 where the DSW is stored at high pressure. This embodiment enables excess electrical energy in the offshore electrical power grid to be converted to hydro-energy, and be stored in the system through air compression.

The hydro-energy may be converted back to electricity and fed into the grid. Thus, DSW exiting the hydro-pneumatic energy storage system can be controllably supplied at a desired pressure to a hydro-electric power unit 42. The hydro-electric power unit 42 includes a hydraulic turbine (not shown) coupled to an electrical generator (not shown). When desired, the deep sea water exiting the hydroelectric power unit 42 may still be used for cooling purposes as long as the exit pressure is high enough to allow the flow of the deep sea water across the pipeline up to the point where such cooling is required.

Figure 5:
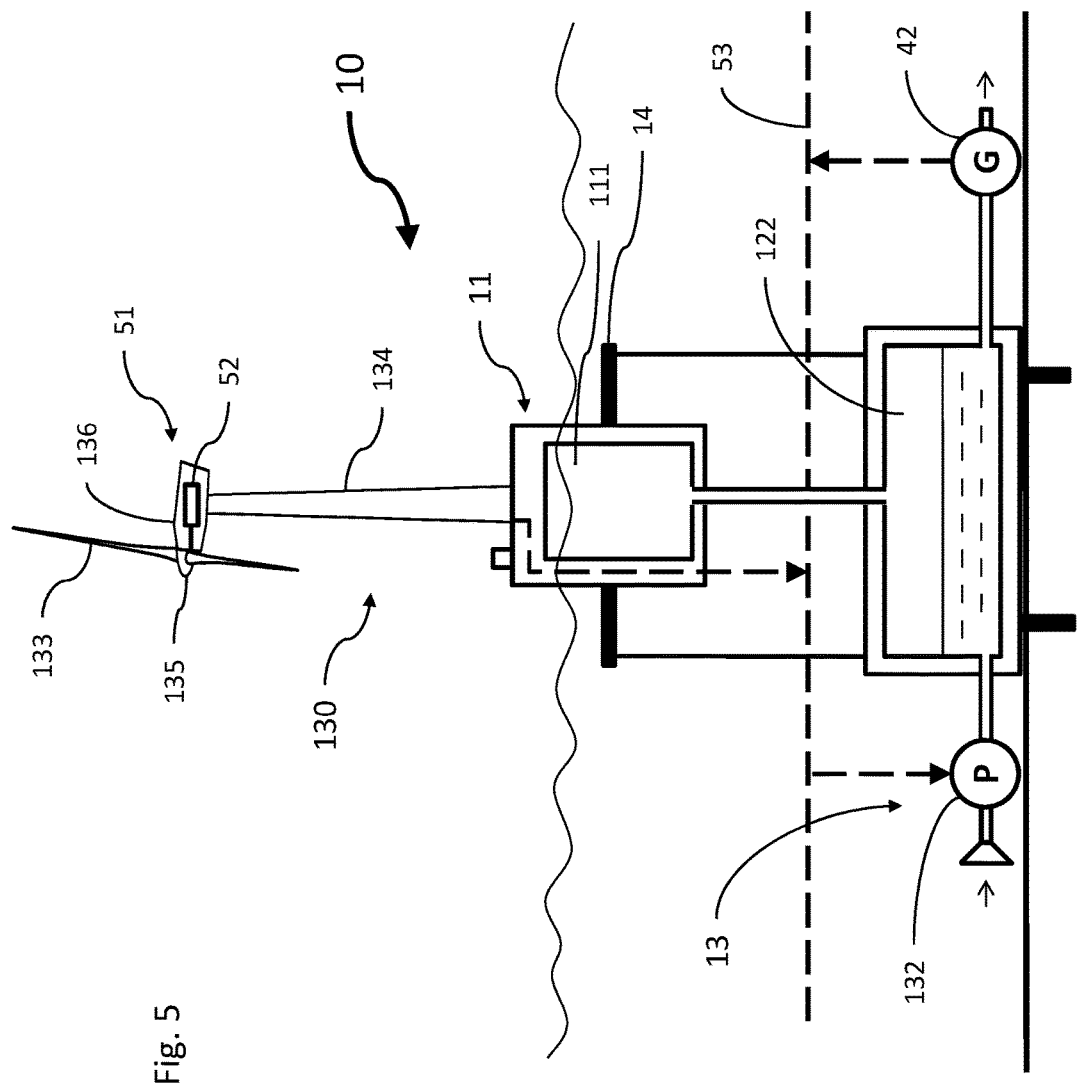
FIG. 5 is a schematic cross-sectional view of the hydro-pneumatic energy storage system configured to utilize wind energy for providing and storing pressurized DSW, according to an embodiment of the present invention.

The hydro-pneumatic energy storage system 10 can be integrated with offshore floating electrical wind turbines. FIG. 5 is a schematic cross-sectional view of the hydro-pneumatic energy storage system 10 configured to utilize wind energy for providing and storing pressurized DSW, according to an embodiment of the present invention.

According to this embodiment, the compression system 13 of the hydro-pneumatic energy storage system 10 is mounted on the floating support platform 14 of the floating support structure 11. As described above, the compression system 13 includes the pump 132 engaged with the prime mover 130, and configured for pumping and pressurizing sea water in order to store it at high pressure.

According to this embodiment, the prime mover 130 of the compression system 13 includes an electrical wind turbine system 51 arranged on a tower 134 that is mounted on the floating support platform 14, however other arrangements of the electrical wind turbine system 51 are also contemplated. In this case the upper floating support structure 11 serves a dual role: (i) to provide the necessary upthrust to support the floating electrical wind turbine system 51 and (ii) to serve as a platform for holding the air chamber 111.

The electrical wind turbine system 51 has a plurality of wind vanes 133 disposed to intercept prevailing winds, a rotor 135 driven by the wind and an electrical generator 52. The electrical generator 52 can, for example, be arranged in a nacelle 136 of the turbine system 131 and connected to an offshore electrical power grid 53. The rotor 135 of the electrical wind turbine system 51 is operatively engaged with the electrical generator 52 to generate output electrical power and provide it to the grid.

The floating electrical wind turbine system 51 generates electricity and is therefore electrically interfaced with the storage system and the grid. Similar to the embodiment shown in FIG. 4, the pump 132 of the compression system 13 is coupled to the offshore electrical power grid 53. In operation, the pump 132 is powered by the grid, pumps deep sea water and supplies it to the sea-bottom accumulator chambers 122 where the DSW is stored at high pressure.

DSW exiting the hydro-pneumatic energy storage system can be controllably supplied at a desired pressure to the hydro-electric power unit 42. The deep sea water exiting the hydroelectric power unit 42 may still be used for cooling purposes as long as the exit pressure is high enough to allow the flow of the deep sea water across the pipeline up to the point where such cooling is required.

Figure 6:
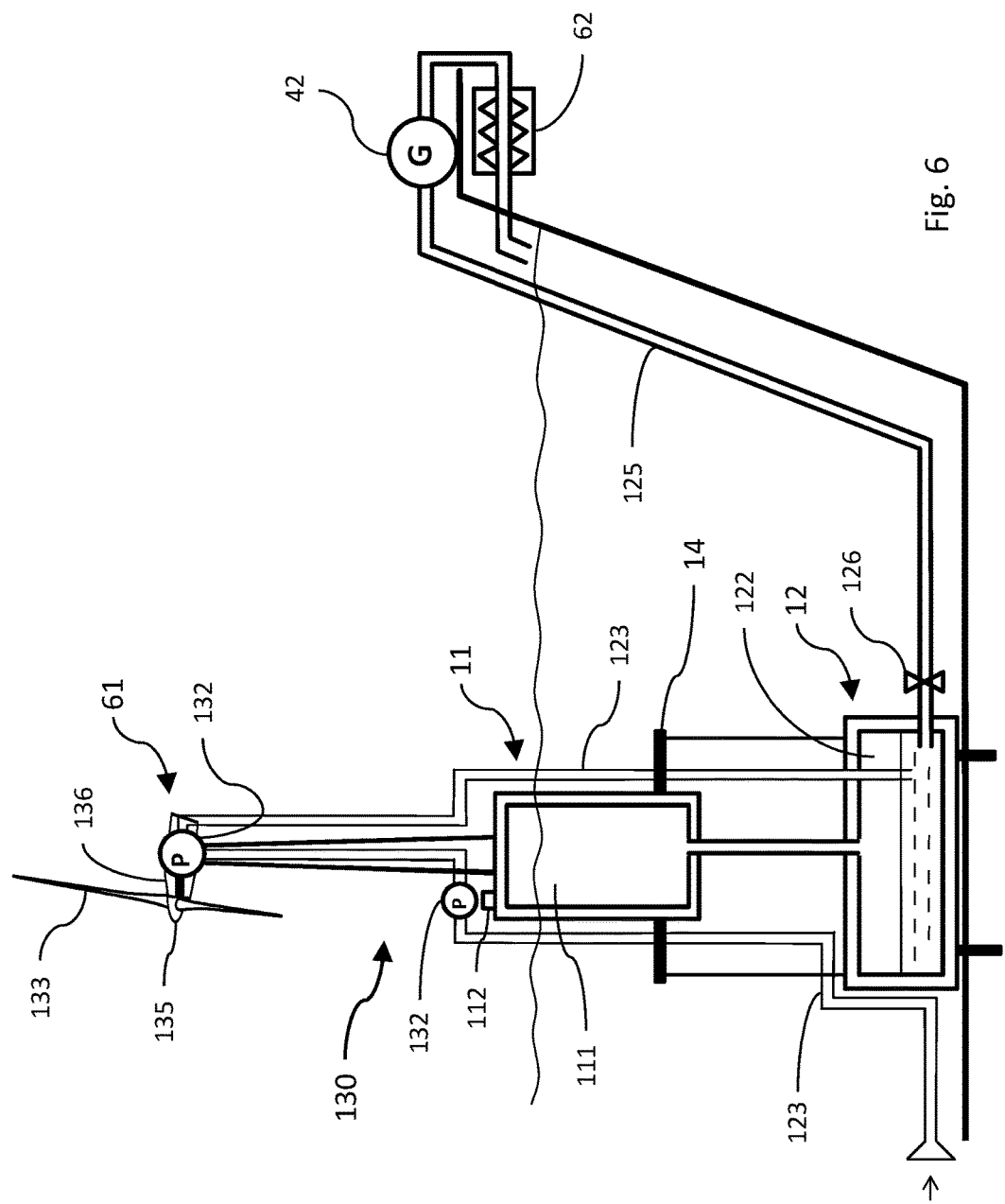
FIG. 6 is a schematic cross-sectional view of the hydro-pneumatic energy storage system configured to utilize wind energy for providing and storing pressurized DSW, according to another embodiment of the present invention.

FIG. 6 is a schematic cross-sectional view of the hydro-pneumatic energy storage system 10 configured to utilize wind energy for providing and storing pressurized DSW, according to another embodiment of the present invention. According to this embodiment, the compression system 13 of the hydro-pneumatic energy storage system 10 includes the pump 132 that is also mounted on the floating support platform 14 of the floating support structure 11.

In this case, the prime mover 130 associated with the compression system 13 includes a hydraulic wind turbine system 61. The hydraulic wind turbine system 61 can, for example, be arranged on the tower 134 that is mounted on the floating support platform 14, however other arrangements of the hydraulic wind turbine system 61 are also contemplated. For instance, the hydraulic wind turbine system can be mounted on a mast (not shown) fixed to the sea-bed.

Contrary to the embodiment shown in FIG. 5, in the case shown in FIG. 6, the electrical generator (52 in FIG. 5) is replaced by a pump that supplies pressurized sea water to the hydro-pneumatic energy storage system 10. The hydraulic wind turbine system 61 has a plurality of wind vanes 133 disposed to intercept prevailing winds and a rotor 135 driven by the wind. According to this embodiment, the rotor 135 of the hydraulic wind turbine system 61 is operatively engaged with the pump 132 that is arranged in a nacelle 136 of the wind turbine system 61. An example of the pump 132 includes, but is not limited to, a positive displacement hydraulic pump. The rotor 135 can, for example, be directly connected to the hydraulic pump 132.

In operation, deep sea water (DSW) flows up and down the turbine tower by means of the hydraulic pump 132. The pump 132 can, for example, be a pressure boost pump to enable the water to go up the tower. The pump 132 is operatively engaged to draw DSW through the sea water pipeline 123 to supply the DSW to the sea-bottom accumulator chamber 122, where the DSW is stored at high pressure.

DSW exiting the hydro-pneumatic energy storage system can be controllably supplied at a desired pressure through the outlet pipeline 125 to the hydro-electric power unit 42. The deep sea water exiting the hydroelectric power unit 42 may pass through a heat exchanger 62 in order to be used for cooling purposes as long as the exit pressure is high enough to allow the flow of the deep sea water across the pipeline up to the point where such cooling is required.

Figure 7:
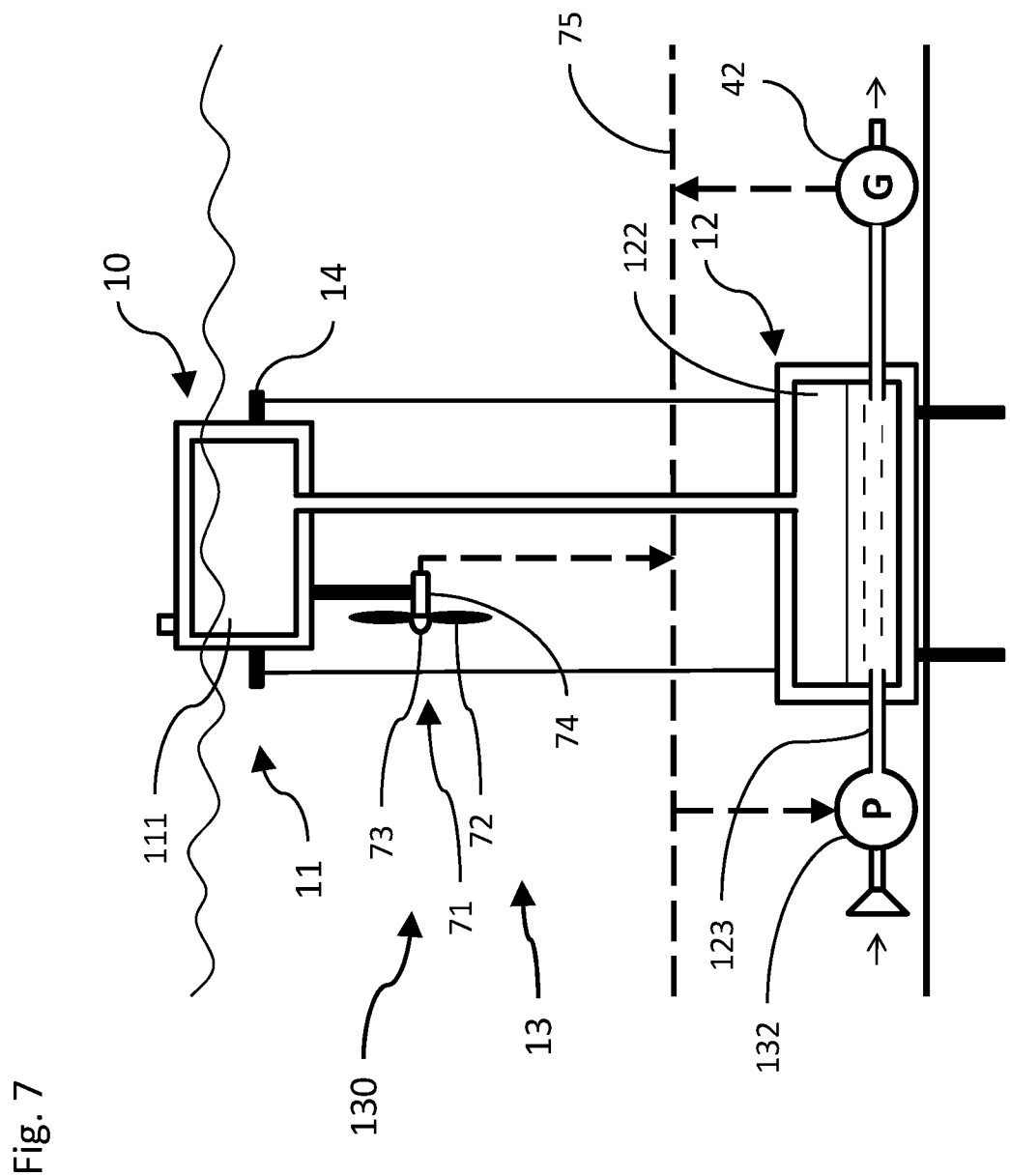
FIG. 7 is a schematic cross-sectional view of the hydro-pneumatic energy storage system configured to utilize tidal energy for providing and storing pressurized DSW, according to an embodiment of the present invention.

The hydro-pneumatic energy storage system 10 can be integrated with offshore floating electrical turbines utilizing tidal energy. FIG. 7 is a schematic cross-sectional view of the hydro-pneumatic energy storage system 10 configured to utilize tidal energy for providing and storing pressurized DSW, according to an embodiment of the present invention.

According to this embodiment, the compression system 13 of the hydro-pneumatic energy storage system 10 is mounted on the floating support platform 14 of the floating support structure 11. As described above, the compression system 13 includes the pump 132 that is engaged with the prime mover 130 and configured for pumping and pressurizing sea water in order to store it at high pressure.

According to this embodiment, the prime mover 130 includes an electrical tidal turbine system 71 that is mounted on the floating support platform 14, however other arrangements of the electrical tidal turbine system 71 are also contemplated. In this case the upper floating support structure 11 serves a dual role: (i) to provide the necessary upthrust to support the floating electrical tidal turbine system 71 and (ii) to serve as a platform for holding the air chamber 111.

The electrical tidal turbine system 71 has a plurality of vanes 72 disposed to intercept prevailing tidal current, a rotor 73 driven by the tidal current and an electrical generator 74. The rotor of the electrical tidal turbine system 71 is operatively engaged with the electrical generator 74 to generate output electrical power. When desired, the electrical generator 74 can be connected to an offshore electrical power grid 75.

The floating electrical tidal turbine system 71 generates electricity, and is therefore electrically interfaced with the storage system 10 and the grid 75. Similar to the embodiment shown in FIGS. 4 and 5, the pump 132 of the compression system 13 is an electrical pump that is coupled to the offshore electrical power grid 75. In operation, the pump 132 that is powered by the grid, pumps deep sea water and supplies it to the sea-bottom accumulator chambers 122 where the DSW is stored at high pressure.

Figure 8:
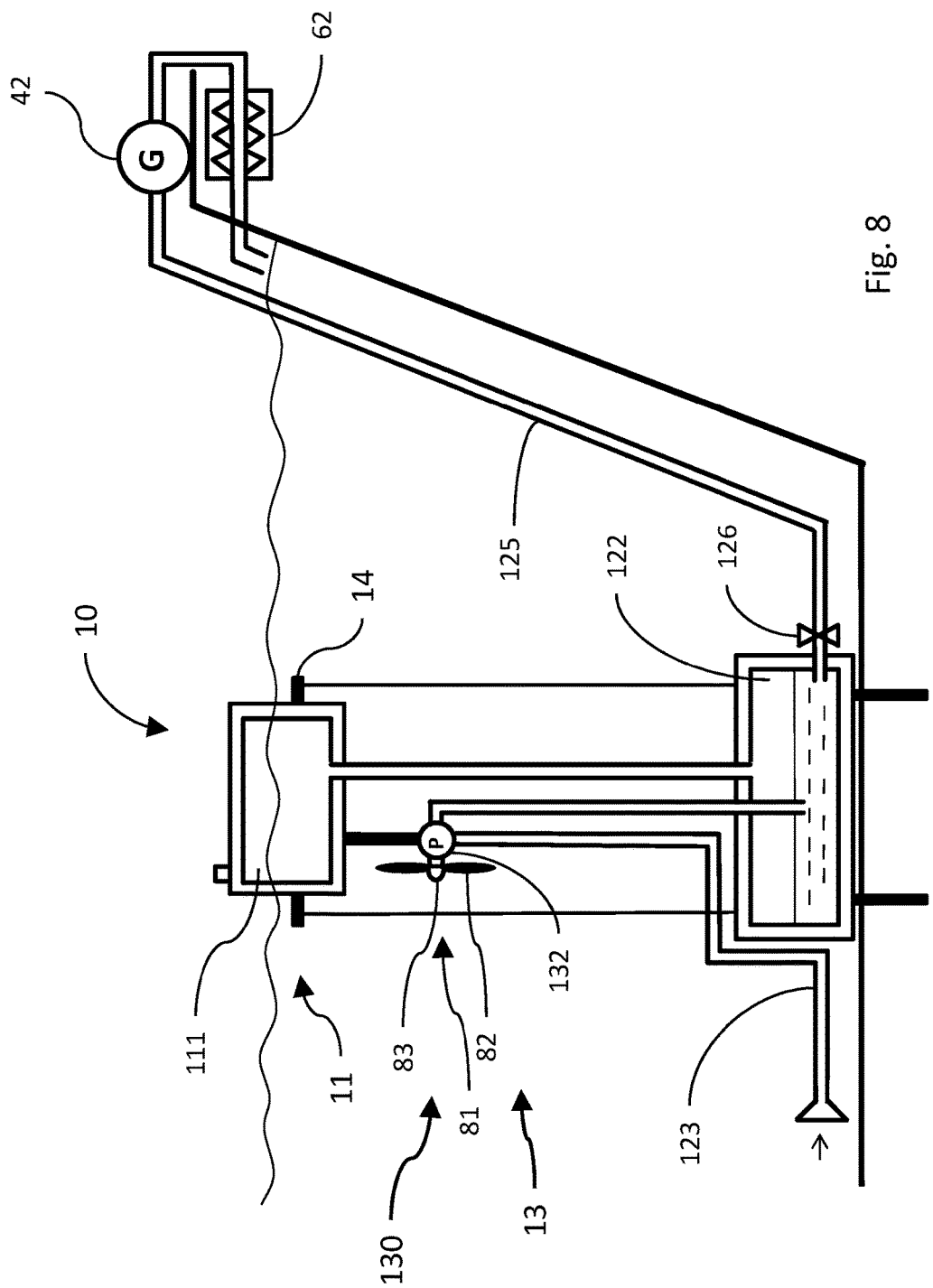
FIG. 8 is a schematic cross-sectional view of the hydro-pneumatic energy storage system configured to utilize tidal energy for providing and storing pressurized DSW, according to another embodiment of the present invention.

FIG. 8 is a schematic cross-sectional view of the hydro-pneumatic energy storage system 10 configured to utilize sea tidal energy for providing and storing pressurized DSW, according to another embodiment of the present invention. According to this embodiment, the pump 132 of the compression system 13 is also mounted on the floating support platform 14 of the floating support structure 11.

In this case, the prime mover 130 engaged with the compression system 13 includes a hydraulic tidal turbine system 81 that is mounted on the floating support platform 14, however other arrangements of the hydraulic tidal turbine system 81 are also contemplated. Contrary to the embodiment shown in FIG. 7, in the case shown in FIG. 8, the electrical generator (73 in FIG. 7) is replaced by a hydraulic pump that supplies pressurized sea water to the hydro-pneumatic energy storage system 10.

The hydraulic tidal turbine system 81 has a plurality of vanes 82 disposed to intercept prevailing tidal current and a rotor 83 driven by the tidal current. According to this embodiment, the rotor 83 of the hydraulic wind turbine system 81 is operatively engaged with the pump 132. According to this embodiment, the pump 132 can, for example, be a positive displacement hydraulic pump. The rotor 135 can, for example, be directly connected to the hydraulic pump 132. In operation, the pump 132 is operatively engaged with the prime mover to draw DSW through the sea water pipeline 123 and to supply the DSW to the sea-bottom accumulator chamber 122, where the DSW is stored at high pressure.

DSW exiting the hydro-pneumatic energy storage system can be controllably supplied at a desired pressure through the outlet pipeline 125 to the hydro-electric power unit 42. The deep sea water exiting the hydroelectric power unit 42 may pass through the heat exchanger 62 in order to be used for cooling purposes as long as the exit pressure is high enough to allow the flow of the deep sea water across the pipeline up to the point where such cooling is required.

Figure 9:
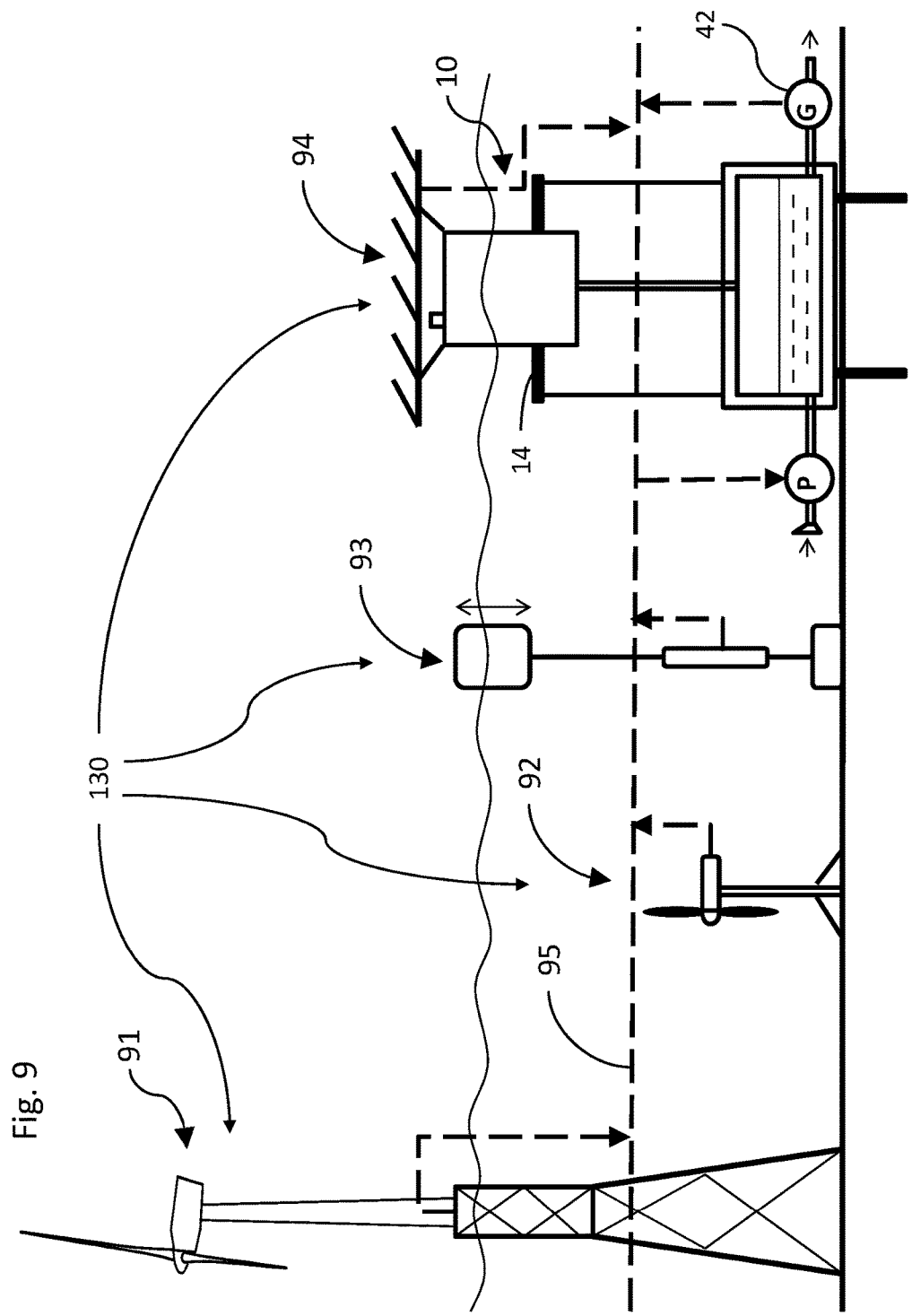
FIG. 9 is a schematic cross-sectional view of the hydro-pneumatic energy storage system configured to utilize solar, wind, sea waves and tidal energy for providing and storing pressurized DSW, according to an embodiment of the present invention.

It should be understood that, when desired, multiple renewable energy systems can be electrically interfaced with the hydro-pneumatic energy storage system 10. FIG. 9 is a schematic cross-sectional view of the hydro-pneumatic energy storage system 10 configured to utilize solar, wind, sea waves and tidal energy for providing and storing pressurized DSW, according to an embodiment of the present invention.

As described above, the compression system (13 in FIG. 1) of the hydro-pneumatic energy storage system 10 includes the pump 132 engaged with the prime mover 130, and configured for pumping and pressurizing sea water in order to store it at high pressure. According to this embodiment, the prime mover that is engaged with the compression system 13, includes a plurality of electrical energy systems utilizing natural energy sources generating output electrical power.

According to this embodiment, the prime mover includes an electrical wind turbine system 91, an electrical tidal turbine system 92, an electrical sea wave energy convertor system 93 and an electrical solar system 94. All these electrical systems are coupled to an offshore electrical power grid 95 to provide output electrical power generated from natural energy sources.

As shown in FIG. 9, the electrical solar system 94 is mounted on the floating support platform 14, while the electrical wind turbine system 91, the electrical tidal turbine system 92 and the electrical sea wave energy convertor system 93 are mounted on the sea bottom, however other configurations of the prime mover 130 are also contemplated. For example, as shown in FIGS. 5 and 7, the electrical wind turbine system 91 and the electrical tidal turbine system 92 can also be mounted on the floating support platform 14. Likewise, when desired, the electrical solar system 94 can be mounted on a mast (not shown) that is fixed to the sea bottom. Although only one of the electrical energy systems for each type of natural energy sources is shown in FIG. 9, it should be understood that any desired number of the electrical energy systems can be interfaced with the storage system 10 and the grid 95.

Similar to the embodiments shown in FIGS. 4, 5 and 7, the pump 132 of the compression system 13 is coupled to the offshore electrical power grid 95. In operation, the pump 132 is powered by the grid, pumps deep sea water and supplies it to the sea-bottom accumulator chambers 122 where the DSW is stored at high pressure.

Referring to FIG. 10, a schematic cross-sectional view of the hydro-pneumatic energy storage system 10 configured to utilize renewable energy of natural sources is illustrated, according to another embodiment of the present invention. According to this embodiment, multiple renewable energy systems can be associated with the hydro-pneumatic energy storage system 10 by using a hydraulic network 150.

According to this embodiment, the prime mover 130 includes a hydraulic wind turbine system 101, a hydraulic sea wave energy convertor system 102 and a hydraulic tidal turbine system 103. As shown in FIG. 10, the hydraulic wind turbine system 101 is mounted on the floating support platform 14, while the hydraulic sea wave energy convertor system 102 and the hydraulic tidal turbine system 103 are mounted on the sea bottom 104, however other configurations of the prime mover 130 are also contemplated. For example, as shown in FIG. 8, the hydraulic tidal turbine system 92 can also be mounted on the floating support platform 14.

According to this embodiment, the compression system 13 includes a hydraulic pump 132a associated with the hydraulic wind turbine system 101, a hydraulic pump 132b associated with the hydraulic sea wave turbine system 102 and a hydraulic pump 132c associated with the hydraulic tidal turbine system 103 of the prime mover 130. For example, the pumps 132a, 132b and 132 can be positive displacement hydraulic pumps.

In operation, the pumps 132a, 132b and 132c pump deep sea water and draw it through the sea water pipelines 123a, 123b and 123c to supply the DSW to the sea-bottom accumulator chamber 122, where the DSW is stored at high pressure.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

Also, it is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A hydro-pneumatic energy storage system for deep sea water (DSW), the hydro-pneumatic energy storage system comprising:
   a sea-bottom mounted structure including a sea-bottom accumulator chamber configured for holding compressed air and the DSW to store the DSW under pressure of the compressed air;
   a floating support structure including a floating support platform and a floating air chamber mounted on the floating support platform, wherein the floating air chamber is configured for holding the compressed air and has a volume sufficient for the compressed air in the floating air chamber to provide stability to the floating support platform by providing a necessary buoyant force to the floating support platform; and
   an air umbilical including an air conduit pneumatically interconnecting the floating air chamber with the sea-bottom accumulator chamber to link compressed air volumes of the floating air chamber and the sea-bottom accumulator chamber to increase the compressed air volume of the sea-bottom accumulator chamber, thereby absorbing pressure transients resulting from intermittent supply of the DSW into the sea-bottom accumulator chamber and pressure transients induced by the DSW discharge, and maintaining a stable pressure within the sea-bottom accumulator chamber as the hydro-pneumatic energy storage system charges with the DSW or discharges.

2. The hydro-pneumatic energy storage system of claim 1, wherein the sea-bottom mounted structure includes:
   a sea water inlet pipeline passing from a DSW region to the sea-bottom accumulator chamber and hydraulically coupled to an inlet port of the sea-bottom accumulator chamber; and
   an outlet pipeline coupled to the sea-bottom accumulator chamber configured to discharge the DSW egress flow.

3. The hydro-pneumatic energy storage system of claim 2, wherein the sea-bottom mounted structure includes an outlet hydraulic control valve arranged in the outlet pipeline and configured to regulate the DSW egress flow from the sea-bottom accumulator chamber.

4. The hydro-pneumatic energy storage system of claim 3, further comprising a control system coupled to the pneumatic control valve and to the hydraulic control valve for controlling operation thereof.

5. The hydro-pneumatic energy storage system of claim 4, wherein the control system includes at least one of the following devices:
   at least one pneumatic pressure sensor configured for producing air pressure sensor signals representative of the air pressure in the floating air chamber and/or the sea-bottom accumulator chamber;
   at least one hydraulic pressure sensor configured for producing hydraulic pressure sensor signals representative of the DSW pressure within the sea water inlet pipeline and/or within the outlet pipeline;
   at least one water level sensor arranged inside the sea bottom mounted structure and configured for producing minimal and maximal DSW level signals when the level of DSW inside the sea-bottom accumulator chamber is out of a predetermined level limit range;
   at least one flow meter arranged within the sea water inlet pipeline and within the outlet pipeline, and configured for producing DSW flow sensor signals representative of the DSW flow within the sea water inlet pipeline and within the outlet pipeline; or
   an electronic controller operatively coupled to the at least one pneumatic pressure sensor, the at least one hydraulic pressure sensor and the at least one flow meter, and being responsive to the air pressure sensor signals, the hydraulic pressure sensor signals, and the DSW flow sensor signals; wherein the electronic controller is capable of generating control signals for controlling the operation of the pneumatic control valve and the hydraulic control valve.

6. The hydro-pneumatic energy storage system of claim 2, further comprising a compression system arranged within the sea water inlet pipeline, the compression system including a pump configured for pumping the DSW through the sea water inlet pipeline to the sea-bottom accumulator chamber for storing the DSW at a predetermined pressure.

7. The hydro-pneumatic energy storage system of claim 6, further comprising a prime mover engaged with the compression system and configured to drive the pump.

8. The hydro-pneumatic energy storage system of claim 7, wherein the pump of the compression system includes an electric pump that is coupled to an electrical power grid and powered by electricity.

9. The hydro-pneumatic energy storage system of claim 8, wherein the prime mover includes an electrical wind turbine system including:
   a rotor driven by wind;
   a plurality of wind vanes disposed on the rotor and configured to intercept prevailing winds; and
   an electrical generator operatively engaged with the rotor and connected to the electrical power grid, the electrical generator is configured to generate output electrical power and provide it to the grid.

10. The hydro-pneumatic energy storage of claim 8, wherein the prime mover includes an electrical tidal turbine system including:
    a rotor driven by tidal current;
    a plurality of wind vanes disposed on the rotor and configured to intercept prevailing tidal current; and
    an electrical generator operatively engaged with the rotor and connected to the electrical power grid, the electrical generator is configured to generate output electrical power and provide it to the grid.

11. The hydro-pneumatic energy storage system of claim 7, wherein the pump of the compression system includes a hydraulic pump.

12. The hydro-pneumatic energy storage system of claim 11, wherein the prime mover includes a hydraulic wind turbine system including:
    a rotor driven by wind and mechanically coupled to the hydraulic pump; and
    a plurality of wind vanes disposed on the rotor and configured to intercept prevailing winds.

13. The hydro-pneumatic energy storage system of claim 11, wherein the prime mover includes a hydraulic tidal turbine system including:

a rotor driven by tidal current and mechanically coupled to the hydraulic pump for driving thereof; and a plurality of vanes disposed on the rotor and configured to intercept prevailing tidal current.

14. The hydro-pneumatic energy storage system of claim 7, wherein:

the pump of the compression system includes an electric pump that is coupled to an electrical power grid and powered by electricity; and wherein the prime mover includes at least one renewable energy system configured to generate output electrical power and provide the electrical power to the grid;

the at least one renewable energy system is selected from the group consisting of an electrical wind turbine system, an electrical tidal turbine system, an electrical sea wave energy convertor system, and an electrical solar system.

15. The hydro-pneumatic energy storage system of claim 7, wherein:

the pump of the compression system includes a hydraulic pump;

the prime mover includes at least one renewable energy system mechanically coupled to the hydraulic pump for driving thereof, the at least one renewable energy system selected from the group consisting of a hydraulic wind turbine system, a hydraulic sea wave energy convertor system, and a hydraulic tidal turbine system.

16. The hydro-pneumatic energy storage system of claim 1, further comprising a set of mooring lines configured for anchoring the floating support structure.

17. The hydro-pneumatic energy storage system of claim 16, wherein the floating support structure is anchored to the sea-bottom mounted structure.

18. The hydro-pneumatic energy storage system of claim 17, wherein the floating support structure is anchored to a sea-bed.

19. The hydro-pneumatic energy storage system of claim 1, wherein the sea-bottom mounted structure is rigidly fixed to a sea-bed by driven piles inserted in the sea-bed.

20. The hydro-pneumatic energy storage system of claim 1, wherein the sea-bottom mounted structure is rigidly fixed to the sea-bed through a gravity-based system.

21. The hydro-pneumatic energy storage system of claim 1, wherein the floating support structure includes a pneumatic control valve pneumatically connected to the floating air chamber, and configured to pressurize the hydro-pneumatic energy storage system with compressed air.

22. A hydro-pneumatic energy storage assembly, comprising a plurality of the hydro-pneumatic energy storage systems of claim 1 arranged in series and interconnected through sea water pipelines.

23. A hydro-pneumatic energy storage assembly, comprising:

a plurality of floating support structures of claim 1 interconnected with a plurality of sea-bottom mounted structures of claim 1 through deep sea water pipelines and through pneumatic pipelines;

wherein the sea-bottom mounted structures are arranged in series and are interconnected through sea water pipelines; and wherein the floating air chamber of each of the plurality of floating support structures is interconnected with the sea-bottom accumulator chambers of two neighboring sea-bottom mounted structures through pneumatic pipelines.

* * * * *